(12) United States Patent
Tirone et al.

(10) Patent No.: US 8,763,835 B2
(45) Date of Patent: Jul. 1, 2014

(54) TOPPING CADDY

(75) Inventors: Christopher Vincent Tirone, East Aurora, NY (US); Diego Hernan Viana, Tonawanda, NY (US); Paul R. Feldner, Menomonee Falls, WI (US); John Patrick Rayburn, Brookfield, WI (US); Gerald Oehmen, Jackson, WI (US)

(73) Assignee: Rich Products Corporation, Buffalo, NY (US)

( * ) Notice: Subject to any disclaimer, the term of this patent is extended or adjusted under 35 U.S.C. 154(b) by 754 days.

(21) Appl. No.: 12/965,122

(22) Filed: Dec. 10, 2010

(65) Prior Publication Data

US 2011/0073616 A1    Mar. 31, 2011

Related U.S. Application Data

(63) Continuation-in-part of application No. 11/950,438, filed on Dec. 5, 2007, now abandoned.

(51) Int. Cl.
*B65D 1/24* (2006.01)
*B65D 77/02* (2006.01)
*B65D 77/04* (2006.01)
*B65D 83/00* (2006.01)

(52) U.S. Cl.
CPC ............... *B65D 77/02* (2013.01); *B65D 77/04* (2013.01); *B65D 2577/00* (2013.01); *B65D 83/0055* (2013.01)
USPC ..................... 220/23.87; 220/23.86; 220/521; 426/115

(58) Field of Classification Search
CPC .......... B65D 2577/00; B65D 2577/04; B65D 2577/041; B65D 77/00; B65D 77/02; B65D 77/04; B65D 83/0055; A47G 21/04; A47G 21/045

USPC ............. 220/23.83, 23.86, 23.87, 23.89, 521, 220/604, 608, 694, 737, 495.01, 495.03; 222/167, 129; 426/106, 115, 112, 109
See application file for complete search history.

(56) References Cited

U.S. PATENT DOCUMENTS

| | | |
|---|---|---|
| 3,632,021 A | 1/1972 | MacManus |
| 4,159,787 A | 7/1979 | Wright |
| 4,205,765 A | 6/1980 | May |
| 4,813,862 A | 3/1989 | Bowers et al. |
| 4,961,517 A | 10/1990 | Tkac |
| 5,040,682 A | 8/1991 | Palisin, Jr. et al. |
| 5,501,369 A | 3/1996 | Tal |
| 5,538,050 A | 7/1996 | Galdon |
| 5,706,980 A * | 1/1998 | Dickerson .................. 222/129 |

(Continued)

*Primary Examiner* — Robert J Hicks
*Assistant Examiner* — Kareen Rush
(74) *Attorney, Agent, or Firm* — Fay Sharpe LLP

(57) ABSTRACT

An apparatus for holding a pastry bag comprises a caddy and an ice-bath container that removably receives the caddy. The caddy includes a tapered receptacle and a flange arranged externally about the tapered receptacle. The container includes a first wall having a generally planar external surface, a second wall adjacent the first wall, the second wall having a generally planar external surface, and a third wall adjacent the second wall. The third wall includes an external surface engaged by the flange and an opening configured to allow insertion of the tapered receptacle into the interior of the container. The flange and/or the external surface of the third wall are configured so that the tapered receptacle is inclined relative to a support surface (e.g. a tabletop) whether the container is placed on its bottom (the first wall) or on its side (the second wall).

23 Claims, 13 Drawing Sheets

(56) References Cited

U.S. PATENT DOCUMENTS

| | | | |
|---|---|---|---|
| 5,711,446 A * | 1/1998 | Jeffs et al. | 220/23.83 |
| 5,952,028 A * | 9/1999 | Lesser | 426/433 |
| 6,116,455 A * | 9/2000 | Rossman et al. | 220/575 |
| 6,153,238 A | 11/2000 | Shannon | |
| 6,708,738 B2 | 3/2004 | Olsen | |
| 6,981,614 B2 | 1/2006 | Niggemyer | |
| 7,802,763 B2 * | 9/2010 | Faller et al. | 248/95 |
| 2003/0183540 A1 | 10/2003 | Onishi | |
| 2006/0065568 A1 | 3/2006 | Yourist | |
| 2008/0087561 A1 | 4/2008 | Faller et al. | |

* cited by examiner

TOPPING CADDY

FIELD OF THE INVENTION

The invention relates to the field of culinary tools, and more particularly to an apparatus for holding generally conical bags of whipped topping, icing, filling, desserts, or similar product (hereinafter such bags are referred to broadly as "pastry bags"). The apparatus of the present invention is useful for holding a pastry bag and keeping the product therein clean and chilled while the pastry bag is at hand for dispensing product during food preparation.

BACKGROUND OF THE INVENTION

Under current practice, topping or icing for pastry is packaged in generally conical pastry bags for application to pastry or other food items through a dispensing tip extending through a bottom tip portion of the pastry bag. Such pastry bags are refrigerated while in storage to keep the contents fresh. In order to decorate a cake or otherwise apply pastry bag contents, a user will typically remove a pastry bag from refrigerated storage and place it on a nearby countertop or other work surface so that it is conveniently at hand.

Handling of the pastry bag is a manual operation wherein a user must pick up the bag and squeeze it while guiding the dispensing tip so as to discharge product from the bag in a controlled and intended manner. It is not uncommon for the pastry bag to be handled and set down repeatedly by a user without being returned to a refrigerated environment.

This situation has a number of shortcomings. If the pastry bag is set down on a flat surface, it may roll off if it is inadvertently bumped. There is also a risk that the dispensing tip and product in the dispensing tip will come into contact with other foods or an unclean food preparation environment, thereby contaminating the dispensing tip and possibly product inside the pastry bag. There is a further risk that the bag may inadvertently come into contact with a sharp tool, such as a knife, exposing the contents to contamination. There is also the risk that the contents of the pastry bag may warm, resulting in reduced quality or spoilage of the contents.

Apart from the shortcomings mentioned above, repeated handling of the bag and storage of the bag at room temperature during use cause the contents to warm up quickly, thereby reducing product freshness and possibly leading to spoilage.

SUMMARY OF THE INVENTION

It is therefore an object of the present invention to provide a "caddy" for holding a pastry bag close at hand to a chef or other user during decoration or preparation of desserts or other food items, wherein the caddy protects the pastry bag and its dispensing tip from damage or contamination.

It is another object of the present invention to provide a caddy apparatus that keeps the contents of a pastry bag chilled during use.

It is a further object of the present invention to provide a caddy that may be used in combination with a cooler or other container holding ice water to hold a pastry bag and chill the pastry bag's contents.

It is another object of the present invention to provide a caddy apparatus that can sit vertically or horizontally.

It is a further object of the present invention to provide a caddy kit having a vessel and a cone.

In furtherance of these and other objects, a caddy for holding a pastry bag in accordance with the present invention generally comprises a tapered receptacle sized to receive at least a dispensing end portion of the pastry bag, and a flange arranged externally about the tapered receptacle. The flange may be a circular flange located about an entrance end of the receptacle and having a peripheral lip for sealing the caddy on a correspondingly sized container in which ice water or some other heat transfer medium is placed. The tapered receptacle may include a closed tip portion at its narrow end for receiving a dispensing tip of a pastry bag without contact, an open cylindrical entranceway portion at its wide end, and a main frusto-conical portion extending between the tip portion and the entranceway portion.

The invention is further embodied by a caddy as summarized above in combination with a container including a plurality of walls defining an interior space, wherein the tapered receptacle of the caddy is spaced from the container walls to define a volume in the interior of the container that surrounds the tapered receptacle, whereby a heat transfer medium may be received in the volume for achieving heat transfer to or from the pastry bag. The flange of the caddy may be configured for sealing attachment to the container, wherein an opening of the container is completely covered by the caddy. Alternatively, the caddy may be placed in a container, such as a cooler, having an ice water bath, wherein the caddy and container are not matchingly configured for sealed attachment to one another and the caddy provides buoyancy and stability when the caddy and pastry bag are placed in a liquid medium. In a particular embodiment, the flange may be in the form of a hollow ring for enhanced buoyancy and stability in a liquid medium.

In another embodiment of the invention, an apparatus for holding a pastry bag comprises a housing defining a body portion and a tapered receptacle surrounded by the body portion, the tapered receptacle being sized to receive at least a dispensing end portion of the pastry bag, and a freezable medium enclosed in the body portion of the housing. The freezable medium may be a freezable gel, water, or other freezable medium, and the housing may be configured such that the apparatus is freestanding. Such an apparatus could be stored as a unit in a freezer until it is needed, and then placed on a countertop or other surface for easy access.

In another embodiment of the invention, an apparatus for holding a pastry bag comprises a caddy including a tapered receptacle and a flange arranged externally about the tapered receptacle. The tapered receptacle is sized to receive at least a dispensing end portion of the pastry bag and includes a longitudinal axis. The apparatus may also comprise a container including a plurality of walls defining an interior of the container, wherein the plurality of walls includes a first wall having a generally planar external surface, a second wall adjacent the first wall, the second wall having a generally planar external surface, and a third wall adjacent the second wall. The third wall includes an external surface and an opening, the opening being configured to allow insertion of the tapered receptacle into the interior of the container. The flange may be configured to engage a lip portion or a flat portion of the external surface of the third wall to limit insertion of the tapered receptacle into the interior of the container. The flange or the external surface of the third wall, or both the flange and the external surface of the third wall, may be configured to cause the longitudinal axis of the tapered receptacle to extend in a direction non-orthogonal to the planar external surface of the first wall. By arranging the flange or external surface of the third wall, or both the flange or external surface of the third wall, non-orthogonal to the first wall allows for the tapered receptacle to be inclined relative to a support surface (e.g. a tabletop) whether the container is placed on its bottom (the first wall) or on its side (the second wall).

The planar external surface of the second wall may be orthogonal to the external surface of the first wall. Further, the tapered receptacle may be conically shaped and include a tip portion arranged to receive a dispensing tip of the pastry bag, the tip portion having a non-tapered configuration and a closed end, such that the dispensing tip of the pastry bag does not contact the receptacle. The container may further comprise a plurality of feet protruding from the external surface of each of the first wall and the second wall to inhibit sliding when the container is placed on a support surface with either the first wall or the second wall facing the support surface.

The flange may be configured to hermetically seal the tapered receptacle to the container so that freezable medium placed within the container does not spill or leak. The tapered receptacle may be sized to receive at least a majority of the pastry bag as measured along the longitudinal axis.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
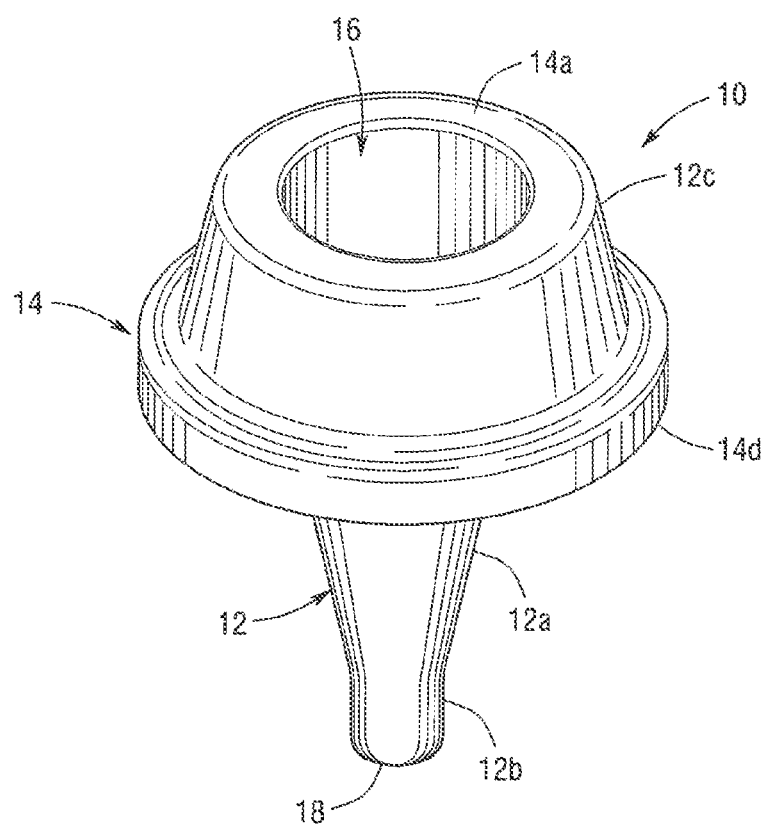
FIG. 1 is a perspective view of a topping caddy formed in accordance with a first embodiment of the present invention.
Figure 2:
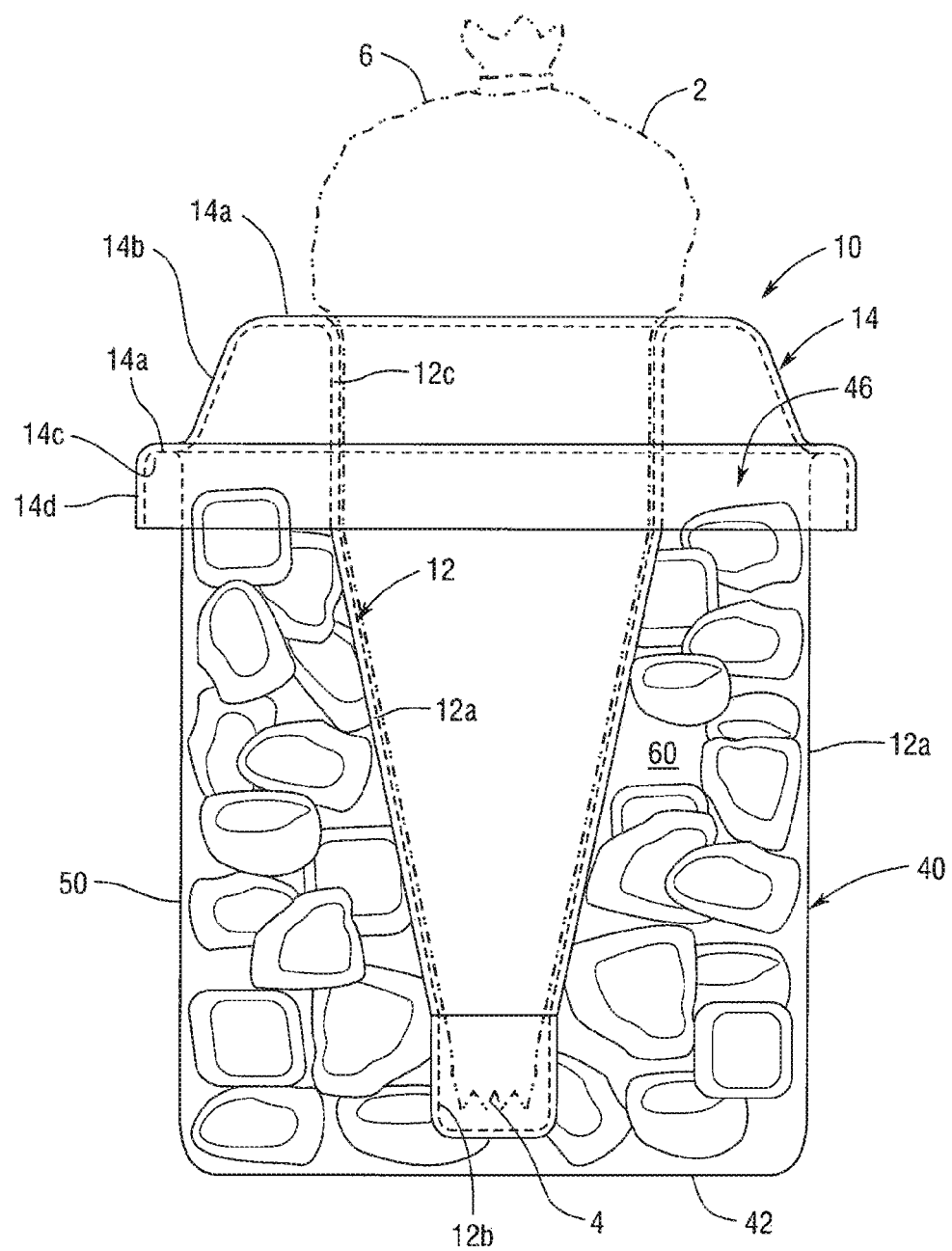
FIG. 2 is a side view of a holder apparatus of the present invention formed by combining the topping caddy of FIG. 1 with a fitted container, wherein a pastry bag held by the topping caddy is indicated in phantom line.

Reference is made initially to FIGS. 1 and 2, wherein a topping caddy formed in accordance with a first embodiment of the present invention is shown and broadly identified by reference numeral 10. Topping caddy 10 is designed to hold a conical pastry bag 2, indicated in phantom line in FIG. 2. Pastry bag 2 is not a part of the present invention.

Topping caddy 10 generally comprises a tapered receptacle 12 sized to receive at least a dispensing end portion of the pastry bag, and a flange 14 arranged externally about the tapered receptacle 12. As used herein, "tapered receptacle" refers to a receptacle wherein at least a portion of the receptacle is characterized by continuous reduction in cross-sectional area. In the present embodiment, the tapered receptacle includes a frusto-conical portion 12A having a linearly decreasing cross-sectional area, however a curved (non-linear) taper may be used without straying from the invention. Tapered receptacle 12 may include a non-tapered tip portion 12B and a non-tapered entranceway portion 12C, which in FIGS. 1 and 2 are formed as cylindrical portions. Tapered receptacle 12 has an open wide end 16 at the mouth of entranceway portion 12C, and a closed narrow end 18 at the distal end of tip portion 12B. As may be understood from FIG. 2, tip portion 12B accommodates a dispensing tip 4 of pastry bag 2 such that the dispensing tip does not contact the receptacle. This feature is advantageous because it helps keep the dispensing tip clean, and it allows some air to remain in tapered receptacle 12 to make it easier to withdraw the pastry bag from the receptacle.

In the first embodiment shown in FIGS. 1 and 2, flange 14 includes an inner portion 14A extending radially outward from wide end 16 of tapered receptacle 12, a sloped portion 14B extending both radially outward from inner portion 14A and axially toward narrow end 18 of tapered receptacle 12, a rim portion 14C extending radially outward from sloped portion 14B, and an annular lip portion 14D extending axially from rim portion 14C toward narrow end 18. Flange 14 may surround cylindrical entranceway portion 12C of tapered receptacle 12, as demonstrated by the depicted embodiment.

With particular reference to FIG. 2, it is noted that the configuration of flange 14 allows topping caddy 10 to be sealed overtop a container 40 for holding a heat transfer medium 60, for example an ice water bath. In the embodiment shown in FIG. 2, container 40 takes the form of a cylindrical container having a bottom wall 42 cooperating with a cylindrical side wall 44 to define an interior space 50 that is accessible through a top opening 46 of the container. Flange 14 may be sized for frictional fit onto a peripheral rim 48 about top opening 46, such that opening 46 is completely covered by topping caddy 10.

Figure 3:
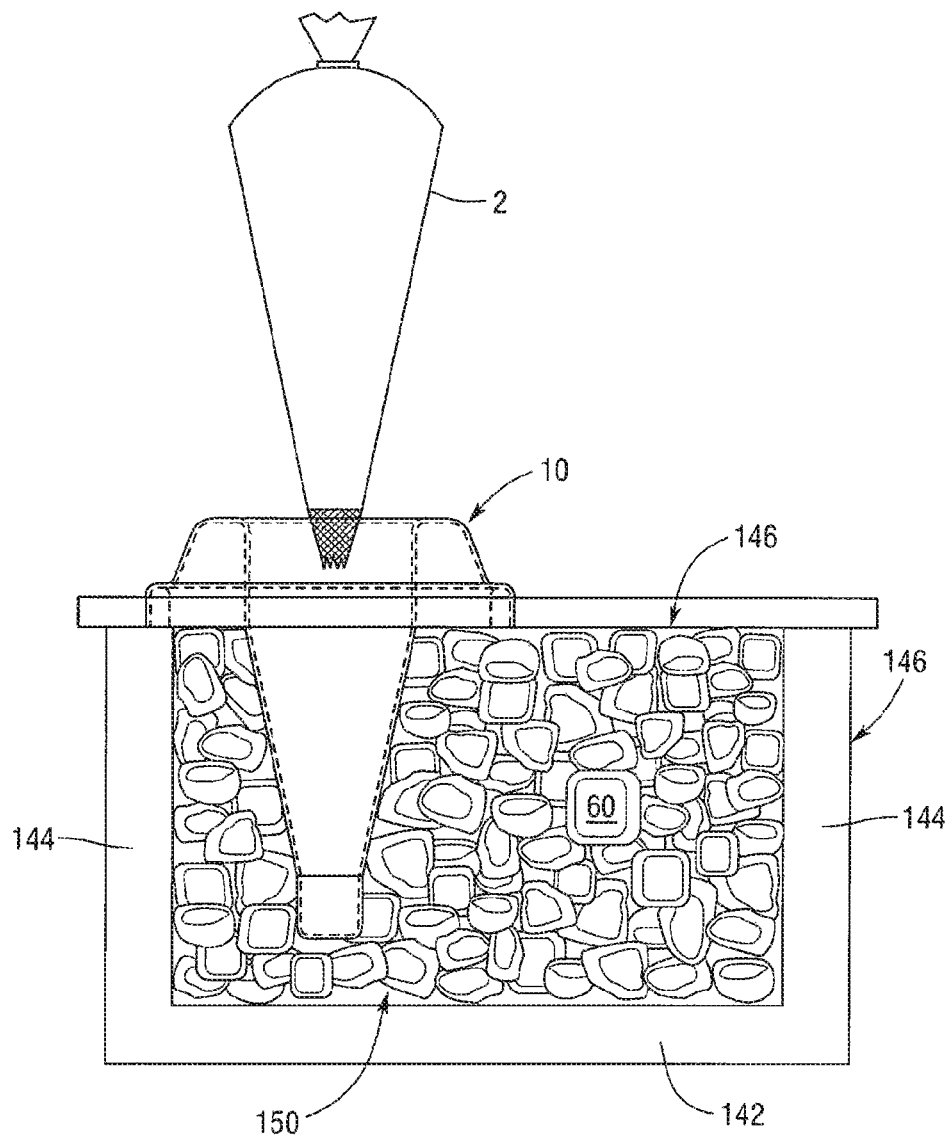
FIG. 3 is a side view showing the topping caddy of FIG. 1 used in combination with an ice water bath.

An alternative arrangement is shown in FIG. 3, wherein a rectangular container 140 having a bottom wall 142 and a plurality of straight side walls 144 is used in combination with topping caddy 10. The walls of container 140 define an interior space 150 which may receive a suitable heat transfer medium 60, such as an ice water bath. In this arrangement, topping caddy 10 may be placed through container opening 146 onto a top surface of heat transfer medium 60, wherein the caddy allows the pastry bag to be immersed in the heat transfer medium without directly contacting the heat transfer medium. For example, container 140 may be a cooler filled with an ice water bath used to cool other items in addition to the pastry bag. FIG. 3 is schematic in nature, and it is understood that a portion of flange 14 of topping caddy 10 may become submerged when pastry bag 2 is inserted into the tapered receptacle of the topping caddy.

Figure 4A:
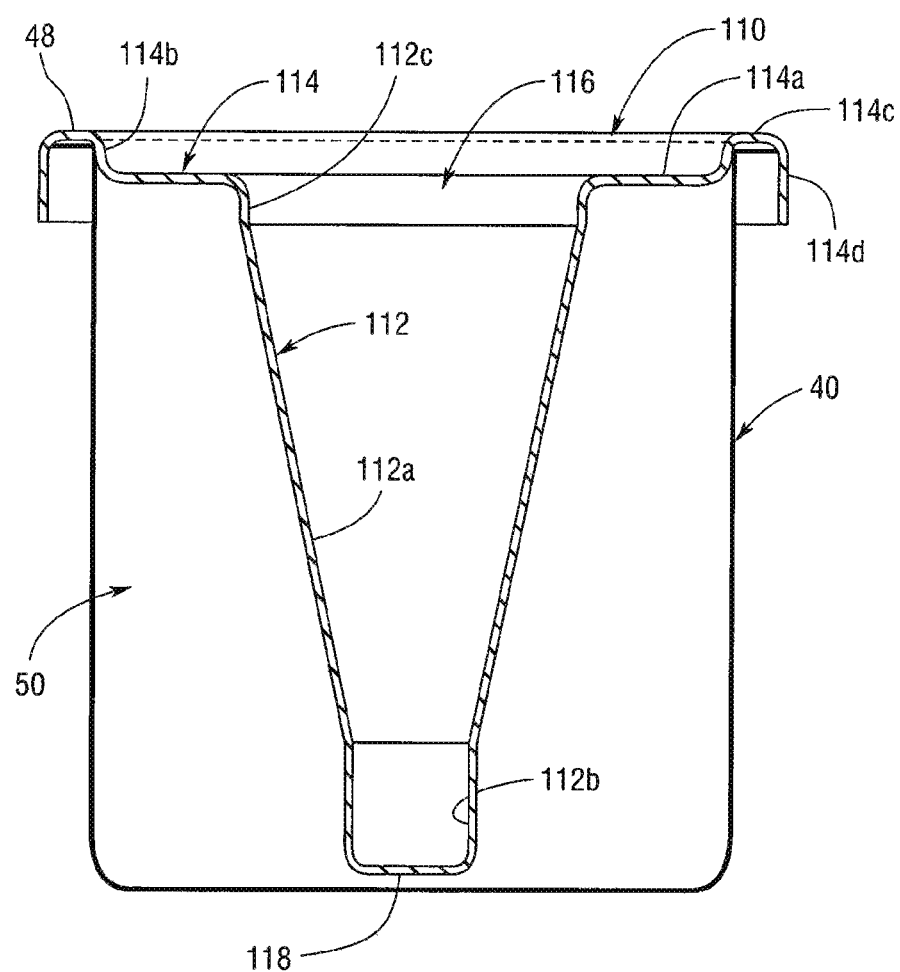
FIG. 4A is a sectional side view showing a topping caddy formed in accordance with a second embodiment of the present invention in combination with a container of a first configuration.
Figure 4B:
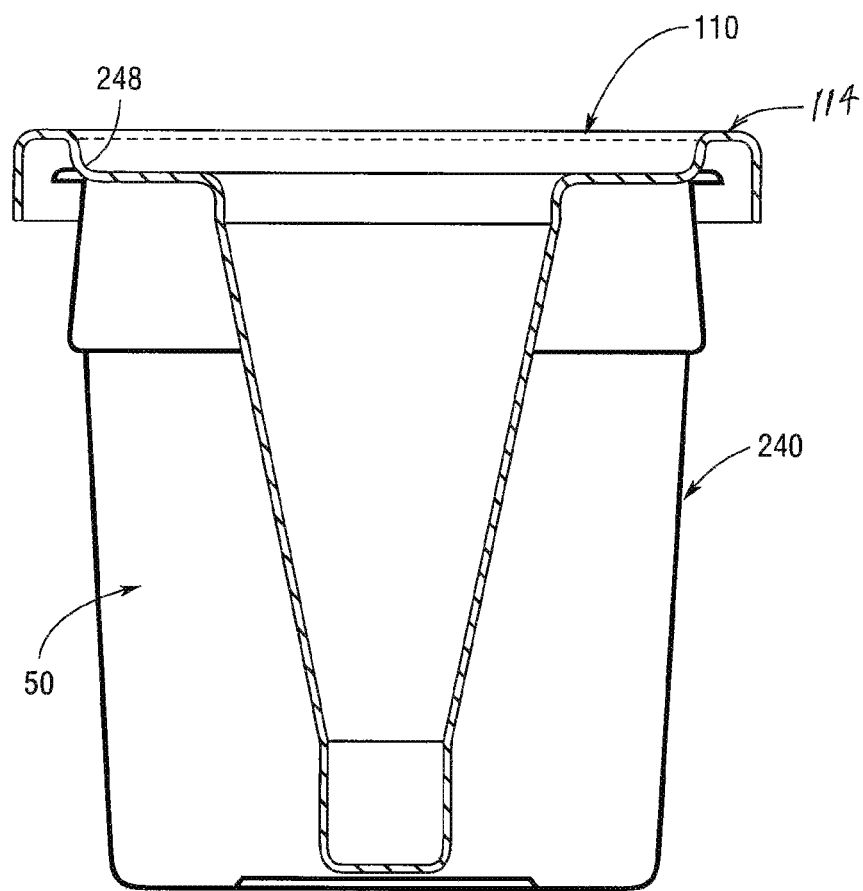
FIG. 4B is a view similar to that of FIG. 4A, however the topping caddy is shown in combination with a container of a second configuration.

FIGS. 4A and 4B illustrate a topping caddy 110 formed in accordance with a second embodiment of the present invention. Topping caddy 110 is generally similar to topping caddy 10 of the first embodiment in that it comprises a tapered receptacle 112 and a flange 114 arranged externally about the tapered receptacle 112. As in the first embodiment, the tapered receptacle 112 is sized to receive at least a dispensing end portion of a pastry bag, and may include a frusto-conical portion 112A, a cylindrical tip portion 112B adjacent a closed narrow end 118, and a cylindrical entranceway portion 112C adjacent an open wide end 116. Cylindrical entranceway portion 112C is shorter than its counterpart 12C of the first embodiment, and flange 114 is generally flatter than flange 14 of the first embodiment. In particular, flange 114 includes an inner portion 114A extending radially outward from wide end 116, a step portion 114B extending both radially outward from inner portion 114A and axially away from narrow end 118, a rim portion 114C extending radially outward from step portion 114B, and an annular lip portion 114D extending axially from rim portion 114C toward narrow end 118. As may be seen in FIG. 4A, the configuration of flange 114 allows topping caddy 110 to be sealed overtop container 40 by frictional fit onto peripheral rim 48. In the arrangement shown in FIG. 4B, topping caddy 110 rests atop container 240 by engagement of flange step portion 114B with a peripheral rim 248 of the container.

Topping caddy 10 of the first embodiment and topping caddy 110 of the second embodiment may be manufactured by forming the caddy as an integral unit from plastic. A translucent plastic may be used and is advantageous because it allows the pastry bag to be generally visible in the caddy, it allows the caddy to be generally visible in an ice water bath, and it allows the interior of tapered receptacle 112 to be visible to make it easier to clean. For example, translucent polypropylene may be used.

The present invention encompasses not only a topping caddy itself, but also a combination of a container with a topping caddy. The container may be partially filled with cold water, ice water, or another heat transfer medium 60 to help maintain the contents of pastry bag 2 at a suitably cool temperature. In this regard, the container may be sized so that the tapered receptacle is spaced from the walls of the container to define a volume in the interior 50 of the container that surrounds the tapered receptacle. It will be realized that some of the interior space 50 will be occupied by the tapered receptacle, and that the container need only be filled partially in order to completely surround the tapered receptacle with heat transfer medium 60 (partial filling avoids overflow spillage when the tapered receptacle is inserted into the container).

Figure 5:
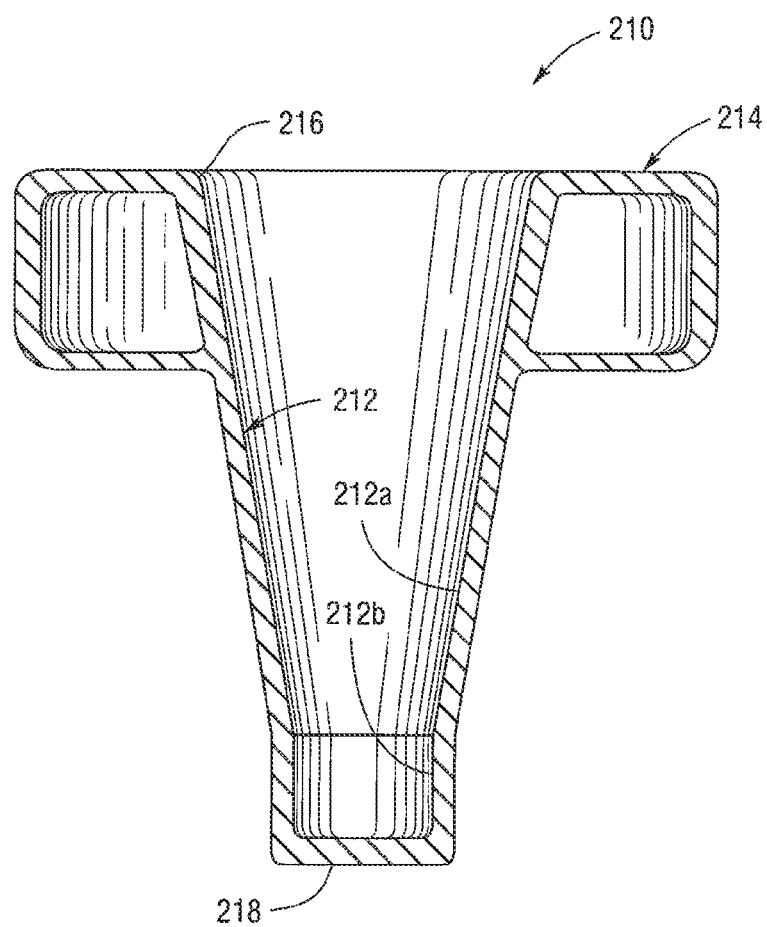
FIG. 5 is a sectional view of a topping caddy formed in accordance with a third embodiment of the present invention.

FIG. 5 illustrates a topping caddy 210 formed in accordance with a third embodiment of the present invention. Topping caddy 210 comprises a tapered receptacle 212 and a flange 214 arranged externally about the tapered receptacle 212. The tapered receptacle 212 includes an open wide end 216 and a closed narrow end 218, and is sized to receive at least a dispensing end portion of a pastry bag through the wide end 216 which serves as an entrance end. Tapered receptacle 212 differs from counterpart structures of the previous embodiments in that it is frusto-conical in shape all the way up to wide entrance end 216, without a cylindrical end portion at such end. Tapered receptacle 212 may include a frusto-conical portion 212A and a cylindrical tip portion 212B adjacent the closed narrow end 218. The embodiment of FIG. 5 is characterized by the fact that flange 214 is in the form of a hollow ring arranged peripherally about tapered receptacle 212 adjacent wide end 216, whereby flange 214 enhances stability and buoyancy of the caddy and pastry bag combination when such combination is placed directly in a liquid heat transfer medium.

Figure 6:
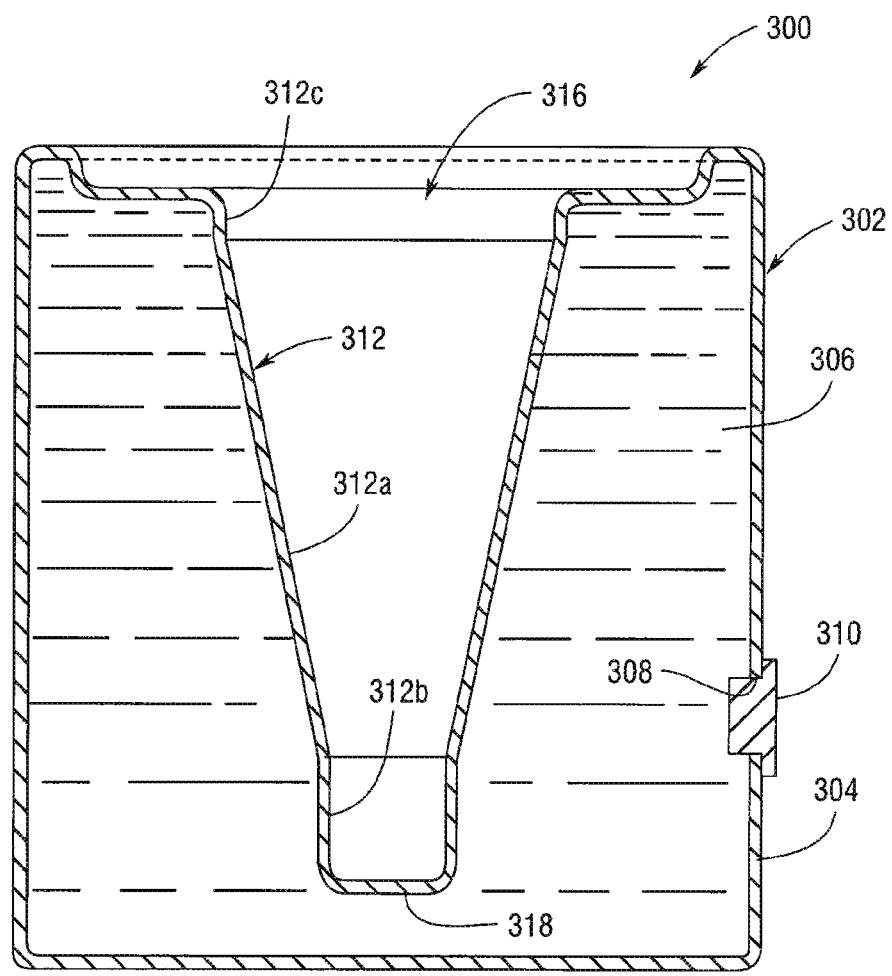
FIG. 6 is a sectional view of a topping caddy formed in accordance with a fourth embodiment of the present invention.

FIG. 6 shows a topping caddy 300 formed in accordance with a fourth embodiment of the present invention. Topping caddy 300 comprises a housing 302 defining a body portion 304 and a tapered receptacle 312 surrounded by the body portion. As in the previous embodiments, the tapered receptacle 312 is sized to receive at least a dispensing end portion of a pastry bag, and may include a frusto-conical portion 312A, a cylindrical tip portion 312B adjacent a closed narrow end 318, and a cylindrical entranceway portion 312C adjacent an open wide end 316. Enclosed within body portion 304 is a freezable medium 306, which may be delivered into the interior of housing 302 through a port 308 during manufacture. Port 308 may be sealed by a plug 310. Housing 302 may be made of molded plastic or other suitable material. Freezable medium 306 may be a freezable gel, water, or other freezable medium. If medium 306 expands during freezing, care should be taken to allow space for expansion so that housing 302 is not damaged or cracked during freezing. Topping caddy 300 may be placed as a unit into a freezer prior to use. Once the freezable medium in caddy 300 is frozen, the caddy may be removed from the freezer and placed on a countertop or other food preparation surface for holding a pastry bag and keeping the pastry bag cool and clean during use. As will be appreciated from FIG. 5, body portion 304 of housing 302 may be configured such that topping caddy 300 is a stable freestanding unit when placed on a surface.

In all embodiments, the depth and taper of the tapered receptacle may be selected with common pastry bag sizes in mind so that the dispensing tip is received within tip portion 12B, 112B, 212B, 312B with room to spare, and the sides of the pastry bag contact the walls of the tapered receptacle. In the first and second embodiments, the flange may be formed to a diameter that provides sufficient stability if the caddy and a pastry bag held thereby are placed in liquid. A flange diameter of at least twenty centimeters has been found suitable with respect to commercially available sixteen ounce pastry bags.

Figure 7:
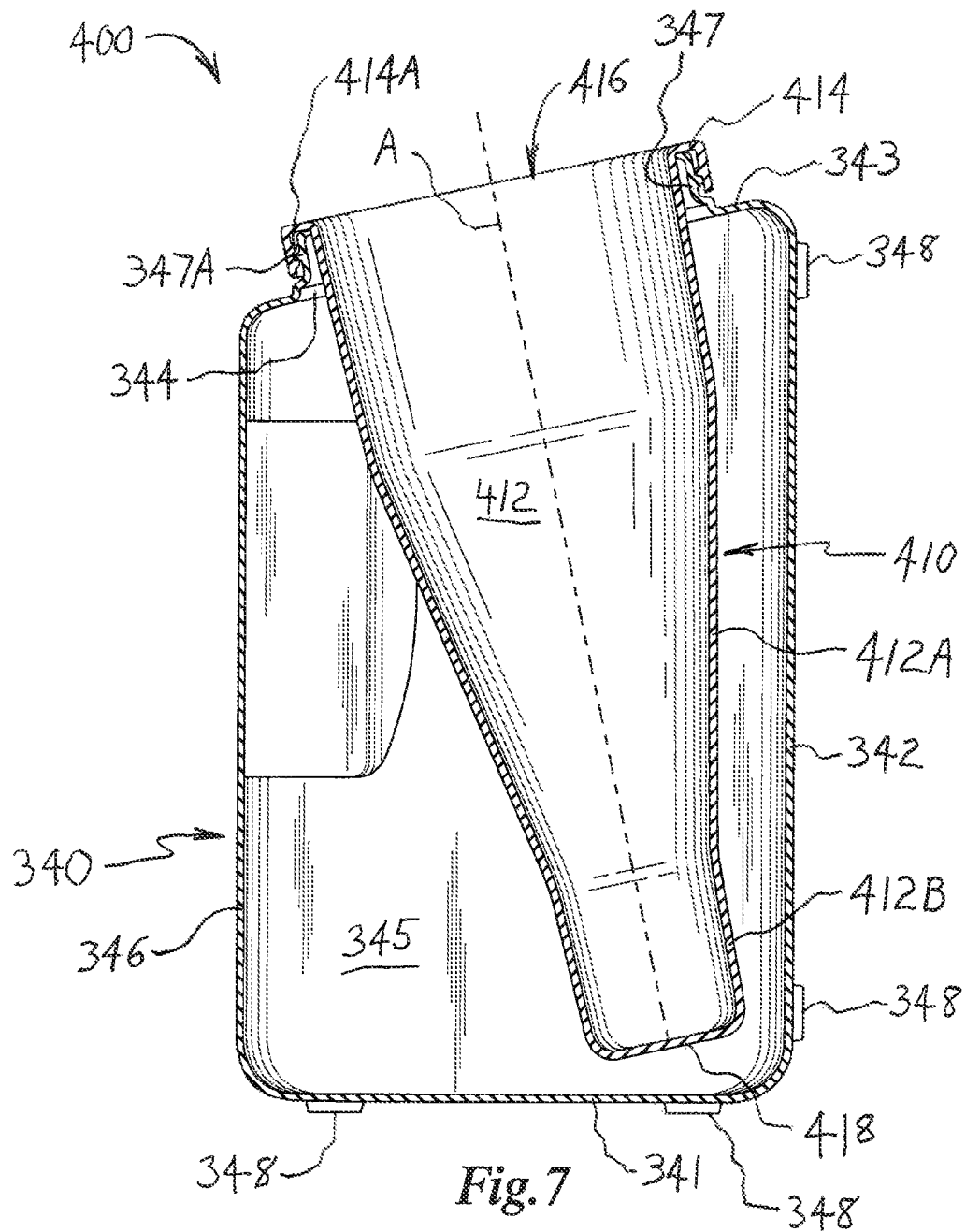
FIG. 7 is a sectional side view showing an apparatus formed in accordance with a fifth embodiment of the present invention, the apparatus comprising a topping caddy in combination with a container.
Figure 8:
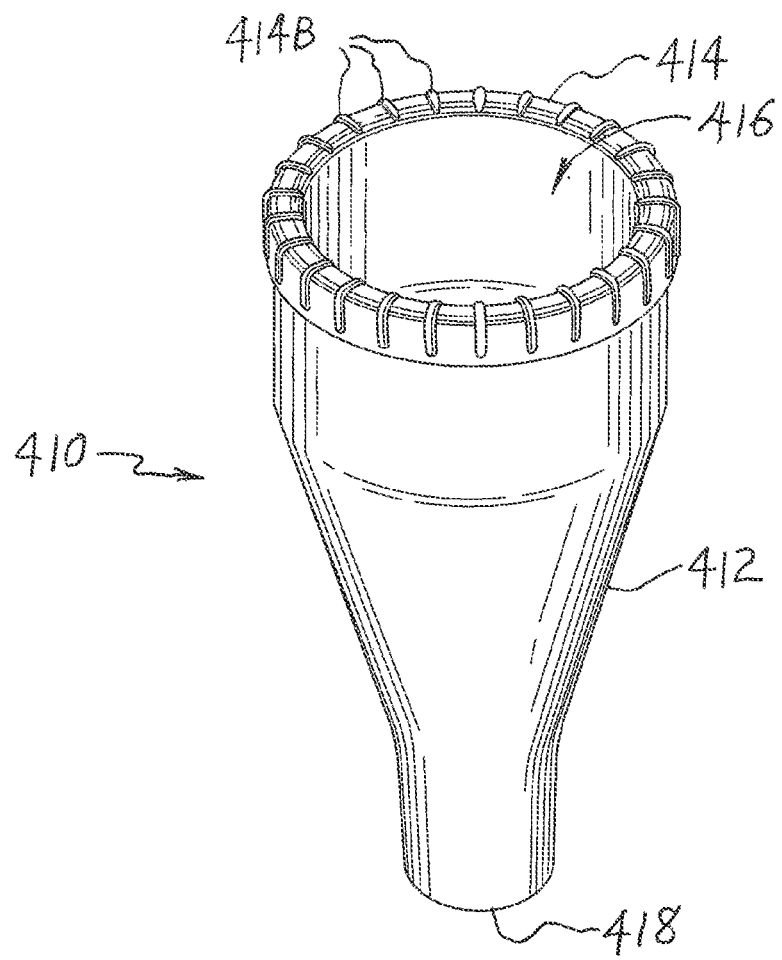
FIG. 8 is a perspective view of the topping caddy of the apparatus shown in FIG. 7.

FIG. 7 shows an apparatus 400 formed in accordance with a fifth embodiment of the present invention. Apparatus 400 generally comprises a topping caddy 410 and a container 340 for holding an ice water bath. The topping caddy 410, shown in greater detail in FIG. 8, comprises a tapered receptacle 412 and a flange 414 arranged externally about the tapered receptacle 412. As in previous embodiments, the tapered receptacle 412 is sized to receive at least a dispensing end portion of a pastry bag, and may include a frusto-conical portion 412A, a cylindrical tip portion 412B adjacent a closed narrow end 418, and an open wide end 416. Tapered receptacle 412 also has a longitudinal axis A.

Container 340 includes a plurality of walls that define an interior 345 of the container. The plurality of walls includes a first wall 341 having a generally planar external surface, a second wall 342 adjacent the first wall 341, the second wall 342 having a generally planar external surface, and a third wall 343 adjacent the second wall 342. The planar external surface of the second wall 342 may be orthogonal to the external surface of the first wall 341. The third wall 343 has an opening 344 surrounded by a lip 347 on an external surface of the third wall. The opening 344 is configured to allow insertion of the tapered receptacle 412 into the interior 345 of the container. Flange 414 is configured to engage lip 347 of third wall 343 to limit insertion of the tapered receptacle 412 into the interior 345 of container 340. Flange 414 may also be configured to engage a flat portion of third wall 343 near lip 347 to limit insertion. As may be understood, container 340 includes one or more additional walls 346 to enclose interior 345 such that interior 345 is accessible only through opening 344.

Figure 9A:
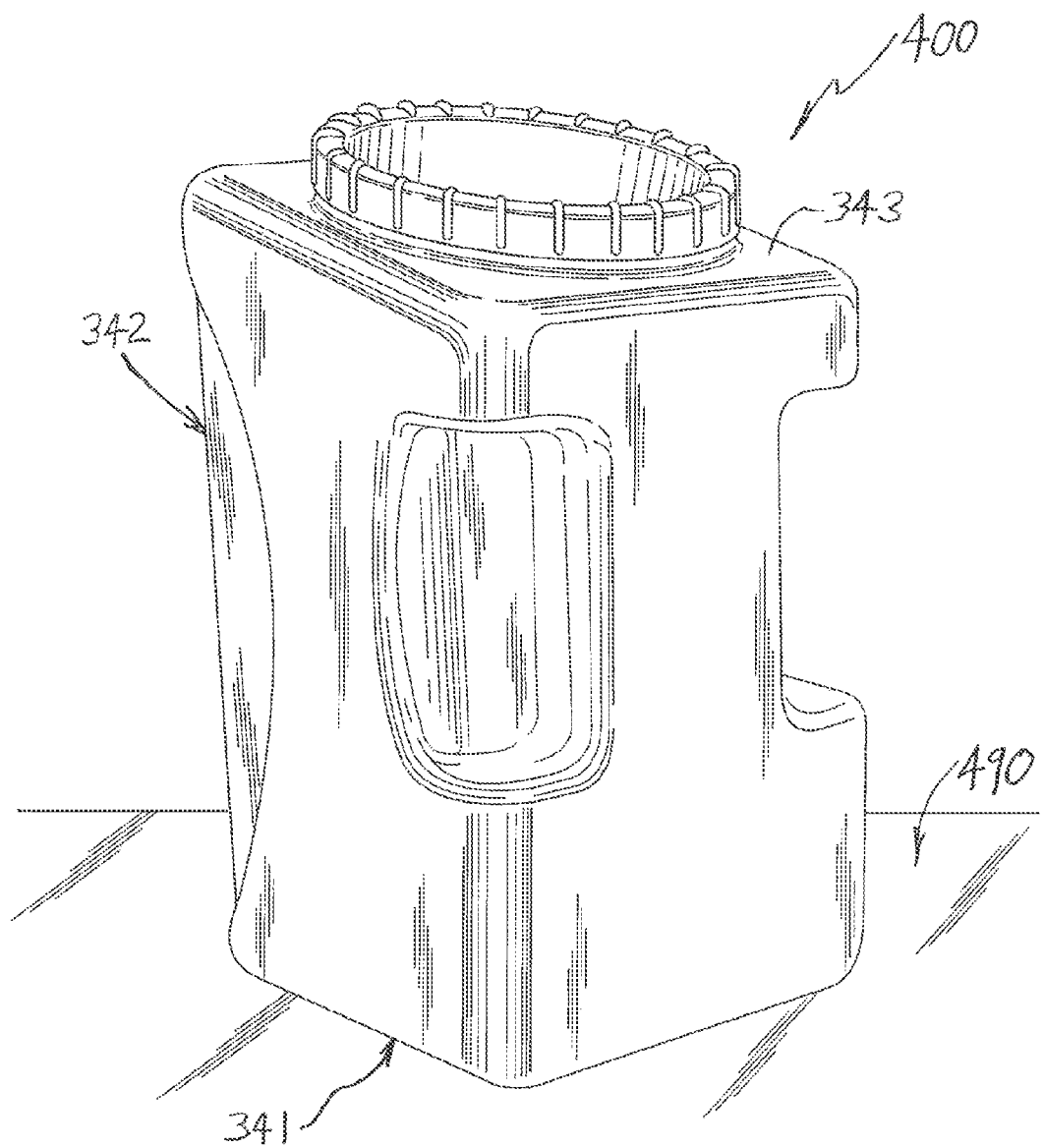
FIG. 9A is a perspective view of the apparatus of FIG. 7 wherein the container is placed on its bottom.
Figure 9B:
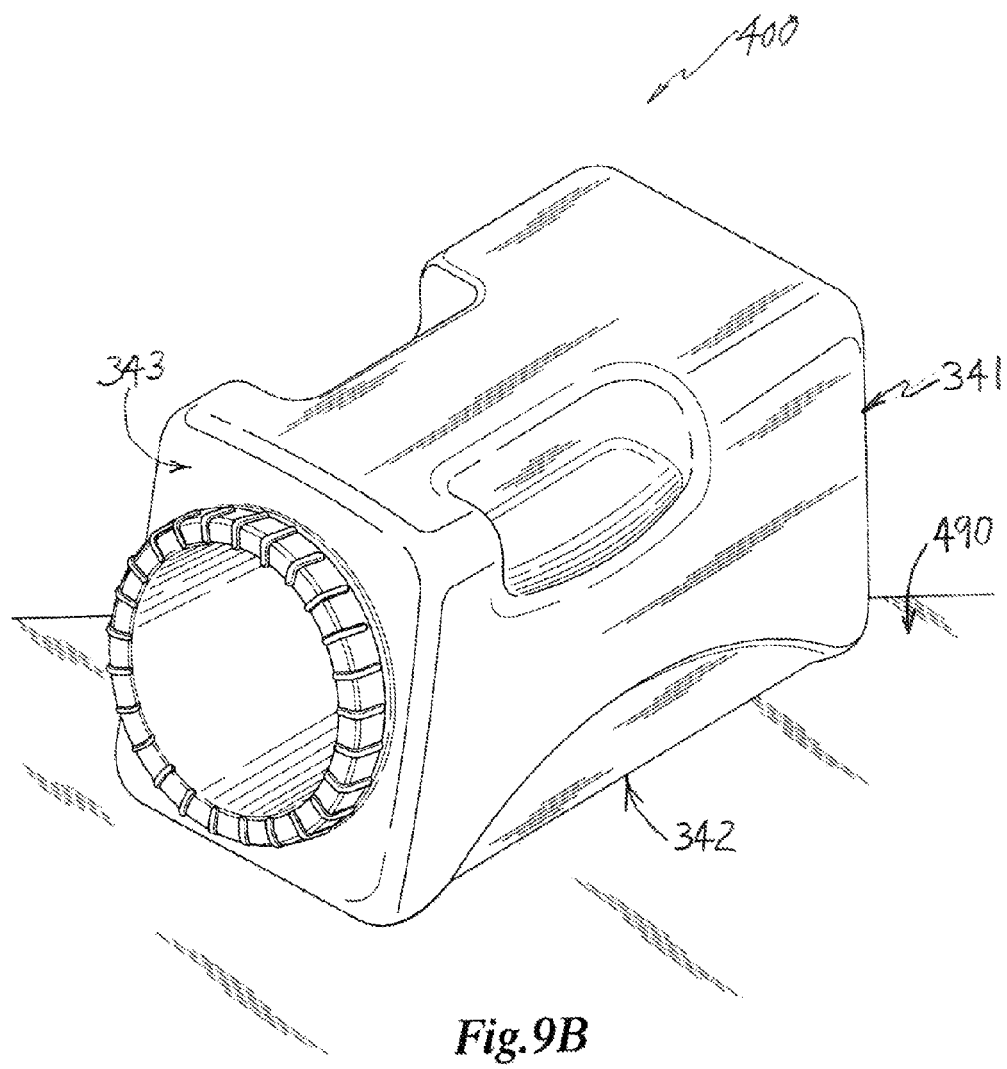
FIG. 9B is a view similar to that of FIG. 9A, however the container is placed on its side.

The external surface of third wall 343 supporting lip 347, or the flange 414, or both, may be configured to cause the longitudinal axis A of tapered receptacle 412 to extend in a direction non-orthogonal (neither normal nor parallel) to the planar external surfaces of first wall 341 and second wall 342. For example, as depicted in FIG. 7, the external surface of third wall 343 may be non-orthogonal to the external surface of first wall 341, and lip 347 may assume the tilted orientation of third wall 343. By engaging flange 414 on lip 347, which is non-orthogonal to the planar external surfaces of first wall 341 and second wall 342, tapered receptacle 412 may be inclined relative to a support surface (e.g. a tabletop) whether container 340 is placed on its bottom (first wall 341) as depicted in FIGS. 7 and 9A or on its side (second wall 342) as depicted in FIG. 9B. As another example, not depicted, an axis of flange 414 may be angularly offset from the axis A of tapered receptacle 412, i.e. the axis of flange 414 may be non-coaxial and nonparallel with axis A of tapered receptacle 412. In this example, third wall 343 and lip 347 could be parallel to first wall 341, but tapered receptacle 412 would nevertheless be tilted or inclined relative to the external surfaces of first wall 341 and second wall 342.

The embodiment of FIG. 7 is characterized by the fact that flange 414 is smaller than previous embodiments and includes threads 414A to threadably attach caddy 410 to container 340 via mating threads 347A provided on lip 347. Alternatively, the flange 414 may be configured to hermetically seal with the lip 347 without the use of threads, for example be a mating press-on configuration involving resilient members. Flange 414 may also includes ribs 414B for improved gripping to make caddy 410 easier to screw onto and off of container 340.

Container 440 may further comprise a plurality of feet 348 protruding from the external surface of each of the first wall 341 and the second wall 342 to allow the caddy to be placed on its first wall 341 (as shown in FIG. 9A) or on its second wall 342 (as shown in FIG. 9B) to inhibit sliding of the container 340 on a support surface 490 (e.g. a tabletop, countertop, or shelf). The feet 348 may be placed only on first wall 341 and second wall 342, and not on any of the other walls of the container, to signify to the user the intended resting positions of apparatus 400.

The flange may be configured to hermetically seal caddy 410 to container 340 so that a freezable medium (not shown) placed within the container does not spill or leak. The tapered receptacle 412 may be sized to receive at least a majority of a pastry bag as measured along longitudinal axis A.

Caddy 410, and container 340, may each be molded as respective integral units from plastic, for example high-density polyethylene (HDPE).

Figure 10:
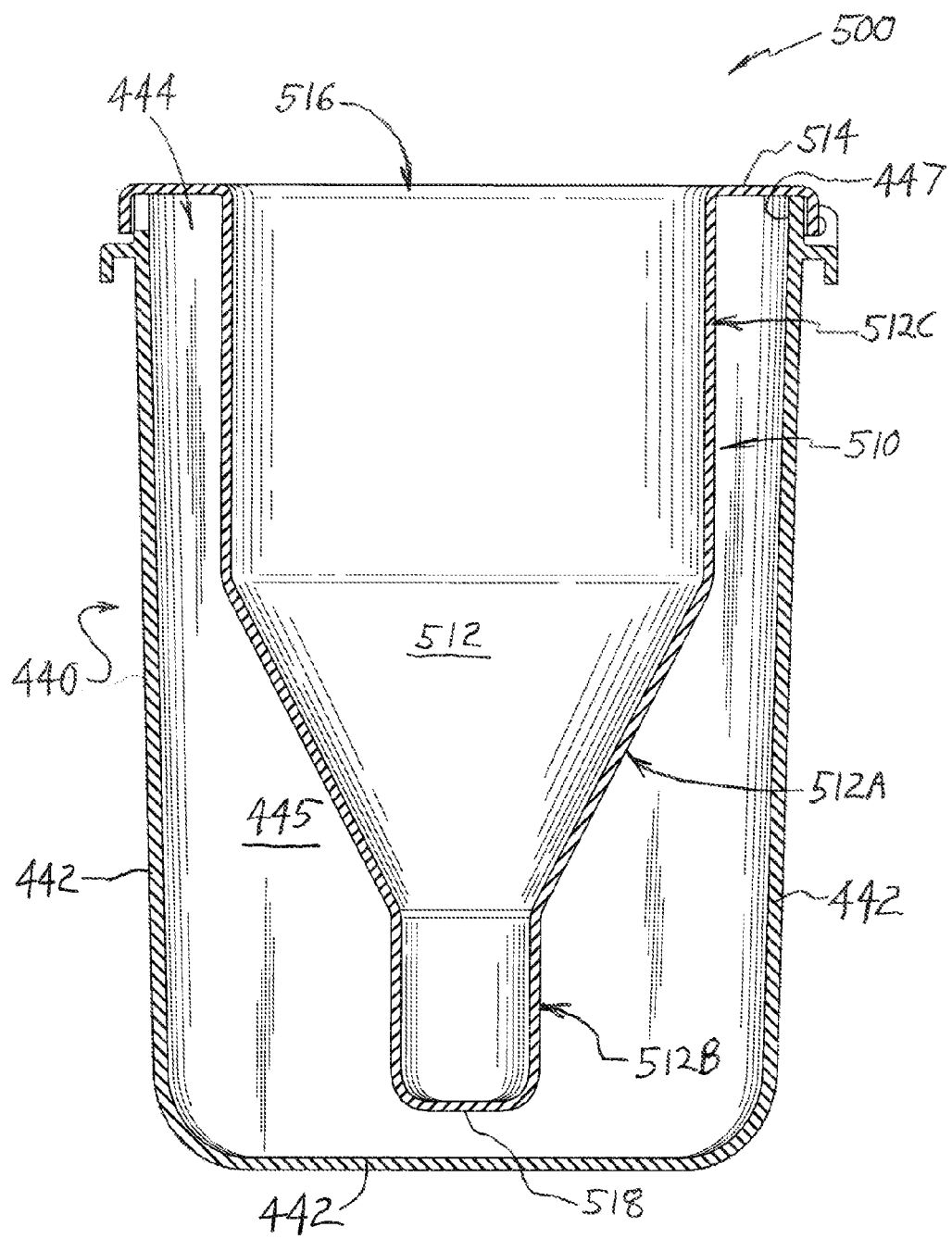
FIG. 10 is a sectional side view showing a showing an apparatus formed in accordance with a sixth embodiment of the present invention, the apparatus comprising a topping caddy in combination with a container.
Figure 11:
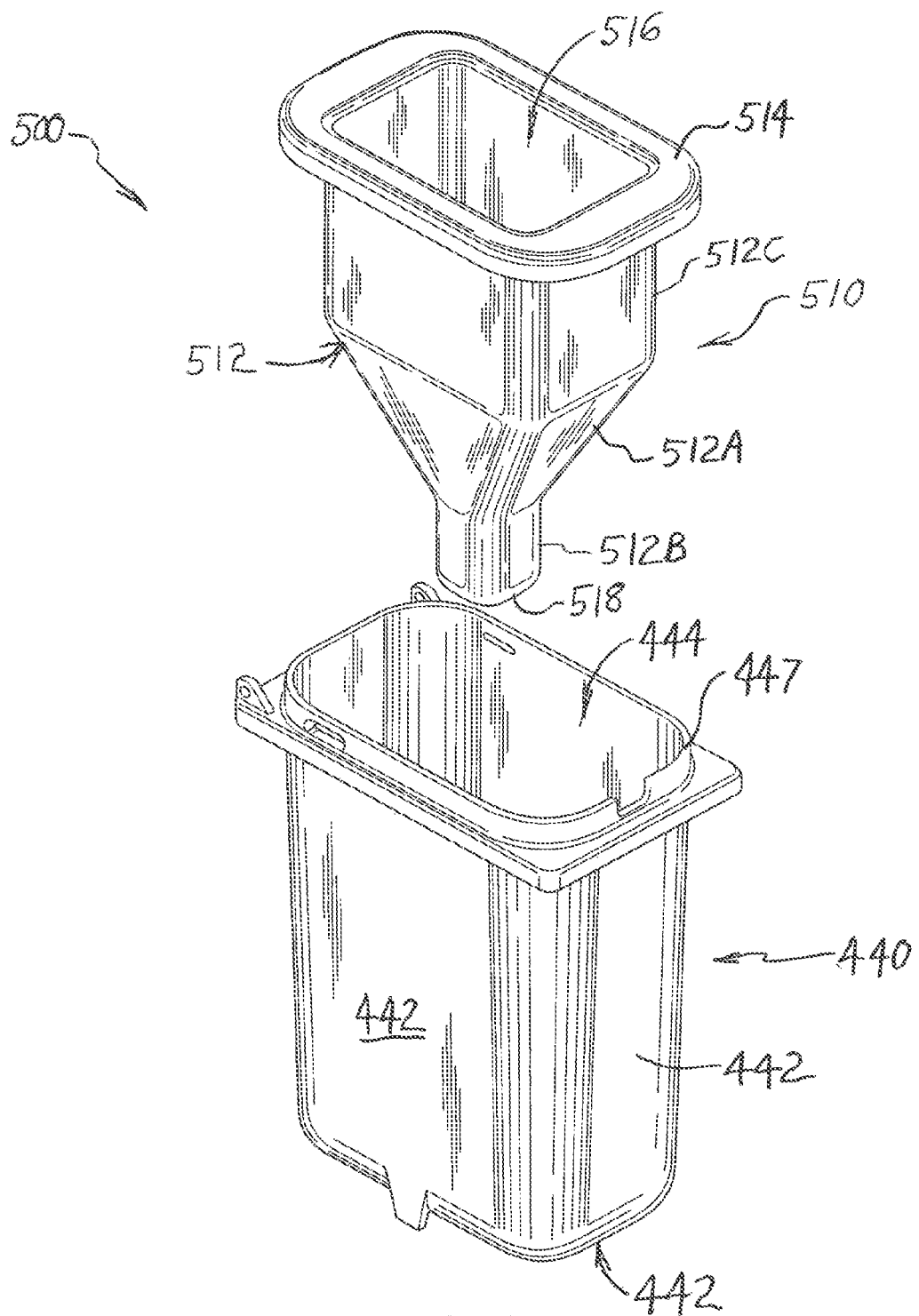
FIG. 11 is an exploded view of the apparatus shown in FIG. 10.

FIGS. 10 and 11 show an apparatus 500 formed in accordance with a sixth embodiment of the present invention. Apparatus 500 generally comprises a topping caddy 510 and a container 440 for holding an ice water bath. Topping caddy 510 includes a tapered receptacle 512 and a flange 514 arranged externally about tapered receptacle 512. As in previous embodiments, the tapered receptacle 512 is sized to receive at least a dispensing end portion of a pastry bag. However, receptacle 512 has a rectangular shape and includes a frusto-pyramidal portion 512A, a rectangular tip portion 512B adjacent a closed narrow end 518, and a rectangular entranceway portion 512C adjacent an open wide end 516. As may be seen, the frusto-pyramidal portion 512A connects rectangular entranceway portion 512C with rectangular tip portion 512B, and flange 514 may be arranged externally about rectangular entranceway portion 512C adjacent open end 516.

Container 440 also has a rectangular shape defined by walls 442 and an opening 444 providing access to an interior 445 of the container. Container 440 further includes a lip 447 about opening 444. As best seen in FIG. 10, tapered receptacle is receivable through opening 444 into container interior 445, and flange 514 is configured to slidably engage and mate with lip 447 to seal caddy 510 onto container 440.

Caddy 510, and container 440, may each be molded as respective integral units from plastic, for example high-density polyethylene (HDPE).

While the invention has been described in connection with various exemplary embodiments, the detailed description is not intended to limit the scope of the invention to the particular forms set forth. The invention is intended to cover such alternatives, modifications, and equivalents of the described embodiment as may be included within the spirit and scope of the invention.

What is claimed is:

1. An apparatus for holding a pastry bag, the apparatus comprising:
   a caddy including a receptacle that is at least partially tapered and that is sized to receive at least a dispensing end portion of the pastry bag, the receptacle including a longitudinal axis, at least a portion of the receptacle having a non-tapered portion, the caddy further including a flange arranged externally about the receptacle; and
   a container including a plurality of walls defining an interior of the container, wherein the plurality of walls includes:
   a first wall having a generally planar external surface;
   a second wall adjacent the first wall, the second wall having a generally planar external surface; and
   a third wall adjacent the second wall, wherein the third wall has an external surface and an opening, the first wall and the third wall are spaced from one another, the opening being configured to allow insertion of the receptacle into the interior of the container;
   wherein the flange is configured to engage the external surface of the third wall to limit insertion of the receptacle into the interior of the container; and
   wherein at least one of the flange and the external surface of the third wall is configured to cause the longitudinal axis of the receptacle to extend in a direction non-orthogonal to the planar external surface of the first wall.

2. The apparatus of claim 1, wherein the external surface of the second wall is orthogonal to the external surface of the first wall and the external surface of the second wall is non-orthogonal to the external surface of the third wall.

3. The apparatus of claim 1, wherein at least a portion of the receptacle is conically shaped and includes a tip portion arranged to receive a dispensing tip of the pastry bag, the tip portion having a non-tapered configuration and a closed end such that the dispensing tip of the pastry bag does not contact the receptacle when the pastry bag is inserted in the receptacle, a cross-sectional area of the tip portion is smaller than a cross-sectional area of the opening of the receptacle.

4. The apparatus of claim 1, further comprising a plurality of feet protruding only from the external surface of the first wall and another plurality of feet protruding only from the external surface of the second wall, each of said feet designed to prevent sliding of the container on a support surface when said feet engage the support surface.

5. The apparatus of claim 1, wherein the flange is configured to hermetically seal the caddy to the container, said flange designed to releasably connect the caddy to the container.

6. The apparatus of claim 5, wherein the flange includes a first set of threads and the container includes a second set of threads configured to mate with the first set of threads, whereby the caddy is removably attached to the container.

7. The apparatus of claim 1, where in the receptacle is sized to receive at least a majority of the pastry bag as measured along the longitudinal axis.

8. An apparatus for holding a pastry bag comprising a container and a caddy, said container including a plurality of walls defining an interior of said container, said plurality of walls including a first wall, a second wall and a third wall, each of said walls having an external surface, said second wall positioned adjacent to said first wall, said third wall positioned adjacent to said second wall, said third wall having an opening providing access to said interior of said container, said first wall and said third wall are spaced from one another, said opening designed to allow at least a majority of said caddy to be inserted in said interior of said container, said caddy including an interior receptacle and a flange, said interior receptacle including a receptacle opening in a top of said interior receptacle and a closed end at a bottom portion of said interior receptacle, said interior receptacle is sized to receive at least a dispensing end portion of the pastry bag, said interior receptacle including a longitudinal axis, said interior receptacle including a first non-tapered portion along said longitudinal axis, said bottom portion of said interior receptacle sized and shaped to prevent the dispensing end portion of the pastry bag from engaging a bottom surface of said interior receptacle, said flange arranged externally of said interior receptacle, said flange is configured to engage said external surface of said third wall to limit insertion of said caddy into said interior of said container.

9. The apparatus as defined in claim 8, wherein said interior receptacle includes a second non-tapered portion, said second non-tapered portion positioned above said tapered portion and said first non-tapered portion positioned below said tapered portion.

10. The apparatus as defined in claim 8, wherein said flange of said caddy and said external surface of said third wall are configured to cause said longitudinal axis of said interior receptacle to extend in a direction non-orthogonal to a central axis of said container.

11. The apparatus as defined in claim 9, wherein said flange of said caddy and said external surface of said third wall are configured to cause said longitudinal axis of said interior receptacle to extend in a direction non-orthogonal to a central axis of said container.

12. The apparatus as defined in claim 11, wherein an external surface of said second wall is orthogonal to an external surface of said first wall and said external surface of said second wall is non-orthogonal to an external surface of said third wall.

13. The apparatus as defined in claim 8, further comprising a plurality of feet protruding only from an external surface of said first wall and another plurality of feet protruding only from an external surface of said second wall, each of said feet designed to prevent sliding of said container on a support surface when said feet engage the support surface.

14. The apparatus as defined in claim 12, further comprising a plurality of feet protruding only from said external surface of said first wall and another plurality of feet protruding only from said external surface of said second wall, each of said feet designed to prevent sliding of said container on a support surface when said feet engage the support surface.

15. The apparatus as defined in claim 8, wherein said flange fully encircles said receptacle opening, said flange is configured to hermetically seal said caddy to said container, said flange designed to releasably connect said caddy to said container.

16. The apparatus as defined in claim 14, wherein said flange fully encircles said receptacle opening, said flange is configured to hermetically seal said caddy to said container, said flange designed to releasably connect said caddy to said container.

17. The apparatus as defined in claim 16, wherein said flange includes a first set of threads and said container includes a second set of threads that is configured to mate with said first set of threads, whereby said caddy is removably attached to said container.

18. A caddy for holding a pastry bag comprising an interior receptacle and a flange, said interior receptacle including a receptacle opening in a top of said interior receptacle and a closed end at a bottom portion of said interior receptacle, said interior receptacle is sized to receive at least a dispensing end portion of the pastry bag, said interior receptacle including a longitudinal axis, said interior receptacle including a first non-tapered portion along said longitudinal axis, said bottom portion of said interior receptacle sized and shaped to prevent the dispensing end portion of the pastry bag from engaging a bottom surface of said interior receptacle, said flange arranged externally of said interior receptacle.

19. The caddy as defined in claim 18, wherein said first non-tapered portion is positioned below said tapered portion.

20. The caddy as defined in claim 18, wherein said interior receptacle includes a second non-tapered portion, said second non-tapered portion positioned above said tapered portion and said first non-tapered portion positioned below said tapered portion.

21. The caddy as defined in claim 18, wherein said flange fully encircles said receptacle opening, said flange includes a first set of threads.

22. The caddy as defined in claim 19, wherein said flange fully encircles said receptacle opening, said flange includes a first set of threads.

23. The caddy as defined in claim 20, wherein said flange fully encircles said receptacle opening, said flange includes a first set of threads.

* * * * *